Figure 1:
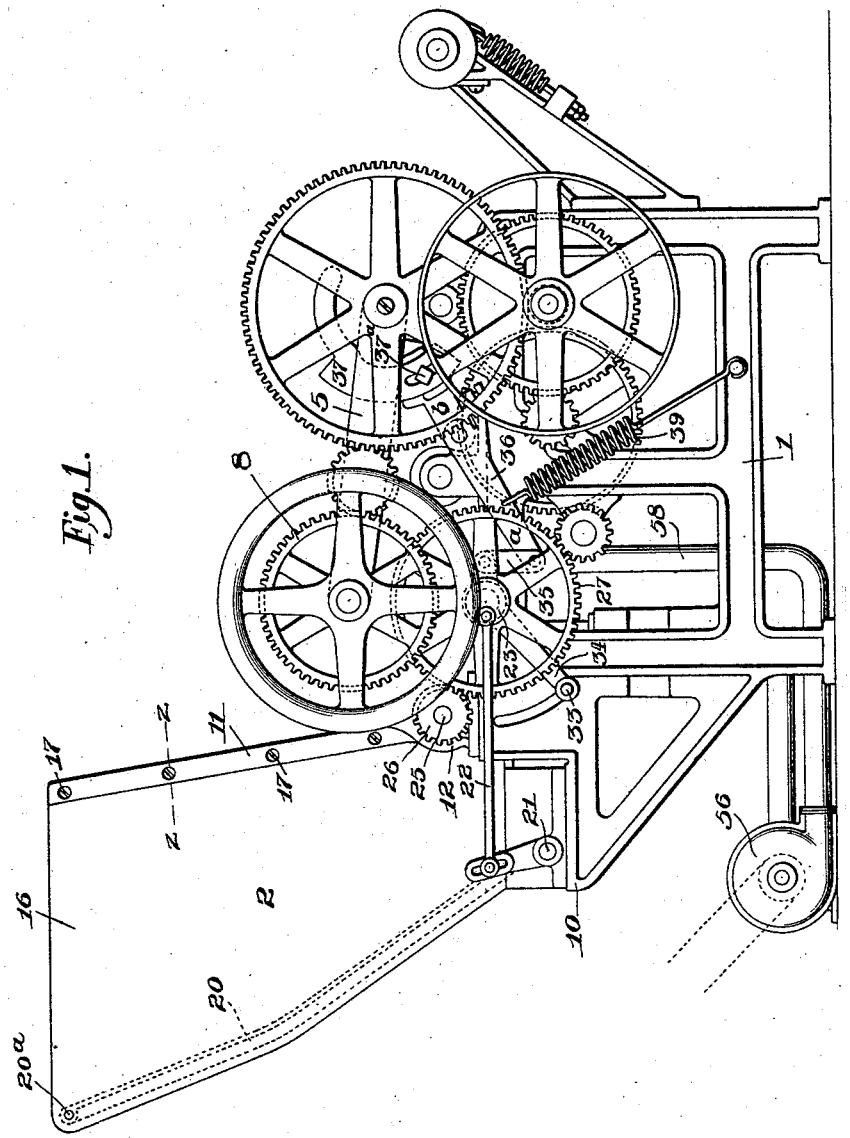

(No Model.) 3 Sheets—Sheet 1.

J. C. DONNELLY.
MATCH MAKING MACHINE.

No. 578,727. Patented Mar. 16, 1897.

WITNESSES:

INVENTOR
Joseph C. Donnelly
BY
John F. Nolan
ATTORNEY.

(No Model.) 3 Sheets—Sheet 2.
J. C. DONNELLY.
MATCH MAKING MACHINE.
No. 578,727. Patented Mar. 16, 1897.
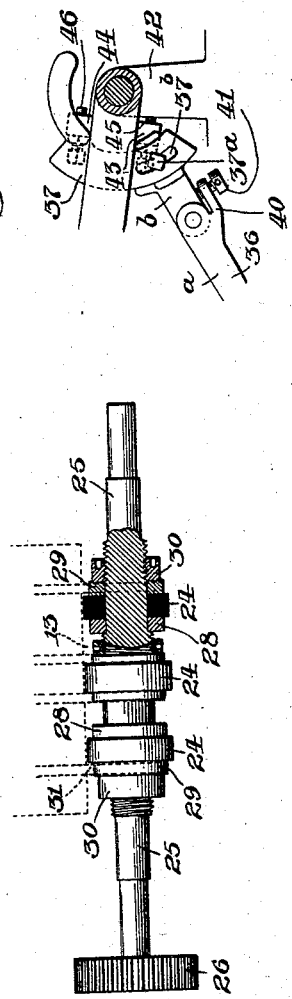
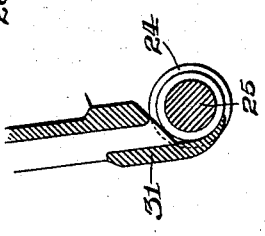
WITNESSES:
Andrew J. Gough
Ira S. Heller
INVENTOR
Joseph C. Donnelly
BY John F. Nolan
ATTORNEY.

(No Model.) 3 Sheets—Sheet 3.
J. C. DONNELLY.
MATCH MAKING MACHINE.
No. 578,727. Patented Mar. 16, 1897.
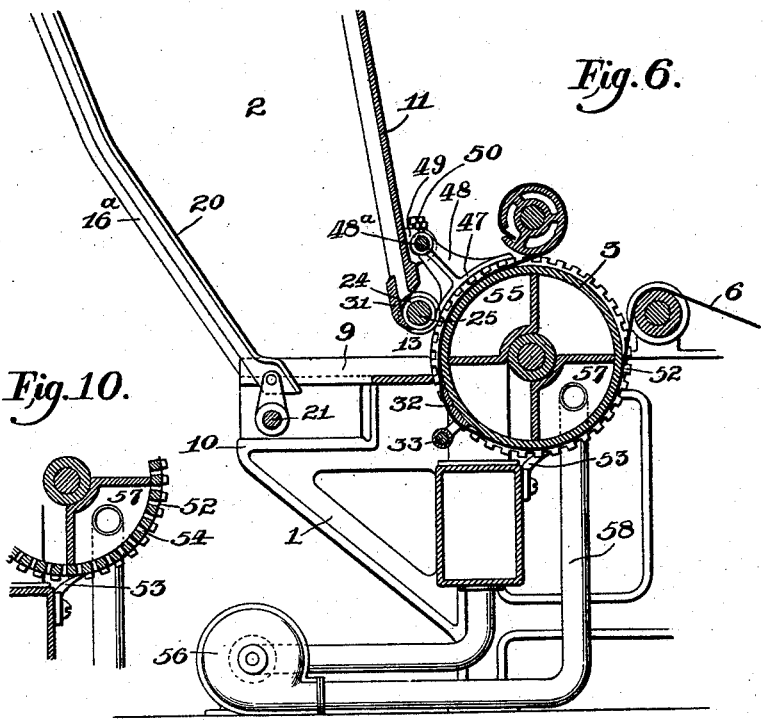
WITNESSES:
Andrew H Young
Ira S. Heller
INVENTOR
Joseph C. Donnelly
BY
John R. Nolan
ATTORNEY.

UNITED STATES PATENT OFFICE.

JOSEPH C. DONNELLY, OF PHILADELPHIA, PENNSYLVANIA.

MATCH-MAKING MACHINE.

SPECIFICATION forming part of Letters Patent No. 578,727, dated March 16, 1897.

Application filed April 16, 1895. Serial No. 545,903. (No model.)

*To all whom it may concern:*

Be it known that I, JOSEPH C. DONNELLY, a citizen of the United States, residing in the city and county of Philadelphia, State of Pennsylvania, have invented certain new and useful Improvements in Match-Making Machines, of which the following is a full, clear, and exact description, reference being had to the accompanying drawings, forming a part of this specification.

This invention relates to match-making machines, and has reference more particularly to the type of machines termed "coilers," in which are provisions for transferring the splints from a suitable hopper to a coiling-web, by the successive convolutions of which they are taken up and assembled.

The objects of the invention may be briefly stated as follows: first, to provide an improved hopper construction; secondly, to provide means for adjusting in respect to the periphery of the feed-drum the usual roller or rollers that regulate the passage of the splints from the hopper to the feed-drum; thirdly, to provide means for preventing the entrance of the splints between the regulating roller or rollers and the opposed edge of the hopper; fourthly, to provide means for arresting the passage of the splints from the hopper to the feed-drum; fifthly, to provide means for maintaining the splints upon the feed-drum during their transference from the hopper to the coiling device; sixthly, to provide means for clearing from the drum any broken or defective splints that escape the coiling device, and, finally, to provide minor features of construction which will be hereinafter pointed out.

In the drawings, Figure 1 is a side elevation of a machine embodying my invention. Fig. 2 is a plan thereof. Fig. 3 is a detail of the adjustable splint-regulating rollers and their supporting-shaft, together with the guard-fingers. Fig. 4 is a sectional detail, enlarged, of one of the guard-fingers and adjacent parts. Fig. 5 is a similar detail, as on the line $x\,x$ of Fig. 2. Fig. 6 is a vertical section, as on the line $y\,y$ of Fig. 2. Fig. 7 is a perspective view of the splint check-shoes and their supporting parts. Fig. 8 is a sectional detail of the hopper, as on the line $z\,z$ of Fig. 1. Fig. 9 is a perspective view of the shaft for adjustably supporting the segmental splint-guards. Fig. 10 is a sectional detail of the feed-drum, showing one of the clearing-fingers in place.

The numeral 1 designates the main supporting-frame, 2 the hopper, and 3 the peripherally-notched feed-drum communicating with the hopper.

5 is the swinging arm, upon the upper or free end of which the coiling-spools are mounted.

6 are the bunching-webs, which pass from the reel 7 to and around the circumferential grooves in the feed-drum, and thence to the coiling-spools. These spools are driven by means of appropriate gearing 8 on the arm 5, such gearing forming part of a power-driven gear-train mounted on the main frame, to the end that the webs are wound upon the spools, the feed-drum being properly impelled by the frictional contact of the moving webs. The transverse peripheral grooves in the feed-drum take up the splints individually from the hopper and convey them to the webs, by and between the coils of which they are successively assembled.

The machine illustrated in the drawings is a duplex apparatus, that is to say, the splint-containing hopper is a double one of novel construction, and the feed-drum and coacting coiling devices are constructed to receive and assemble in separate coils the splints from the respective compartments of the hopper.

The improvements hereinafter described, as will be clear, are applicable as well to a single coiling-machine.

One feature of my invention relates to the construction of the splint-containing hopper, whereby, among other things, its width may be readily changed to accommodate splints of various lengths, and whereby the hopper shall be maintained rigidly in its positions of adjustment. The bottom of the hopper comprises a horizontal plate 9, affixed to a rearward extension 10 of the main frame, and the forward wall of the hopper comprises an upright plate 11, provided with corner lugs or brackets 12, that are bolted to the sides of said frame, an opening or space 13 being formed at the bottom of the plate to permit the passage of the splints from the hopper to the feed-drum. In the plate 9, near each side of the machine, is a series of parallel grooves 14, which communicate with a corresponding series of longitudinal grooves 15 in the plate 11. The sides of the hopper comprise vertical plates 16, whose lower and forward edges are fitted to predetermined communicating grooves in the plates 9 11, respectively, the forward edges of the side plates being firmly held in place by means of screws 17. The ribs or walls of the grooves 15 are provided with orifices 18 for the passage of the screw-heads, the body of the plate 11 being properly tapped to receive the shanks of the screws. Interposed between the screw-heads and the opposed faces of the plates 11 are tapered washers or wedges 19, which, entering the orifices in the ribs of the grooves, draw the side plates tightly against the front plate of the hopper. (See Fig. 8.) The back of the hopper comprises a vibratory plate or plates 20, pivoted at its or their upper end on a shaft $20^a$, supported between the sides of the hopper and connected to a rock-shaft 21, to which motion is imparted by means of a pitman 22, connecting an eccentric 23 on the shaft of the feed-drum with a crank-arm on the rock-shaft.

In a duplex machine of the character above referred to the hopper is divided into two separate splint-containing chambers by means of a central partition $16^a$, the lower and forward edges of which are fitted to corresponding grooves $14^a$ $15^a$ in the bottom and front plates of the hopper, respectively. By the above-described construction it will be seen that the width of the hopper (in a single machine) or of either of its compartments (in a double machine) may be readily changed by applying the side plates, or either of them, to predetermined grooves in the base and front plates.

One end of the shaft $20^a$ is extended through the wall of the hopper and is provided with a nut or nuts $20^b$ thereon, whereby the shaft may be adjusted in accordance with the width of the hopper.

Another feature of the invention relates to the construction of the roller or rollers 24 for insuring the uniform passage of the splints from the hopper to the feed-drum, such rollers being arranged at the discharging portion of the hopper in contact with the periphery of the feed-drum. The rollers are arranged on a transverse shaft 25, on one end of which is a pinion 26, gearing with a spur-wheel 27, mounted loosely on the shaft of the feed-drum, whereby the rollers are rotated contrarily to the feed-drum in a manner to prevent the massing and consequent jamming of the splints between the feed-drum and the edge of the hopper.

The rollers comprise disks of rubber or other suitable yielding material arranged at intervals upon the shaft 25, with means for compressing or clamping the disks laterally for the purpose of varying their diameters and thus effecting their accurate adjustment in respect to the periphery of the feed-drum. In the present instance each of the disks is maintained between two heads 28 29 on the shaft, one, 28, of which heads abuts against a shoulder on the shaft, while the other head, 29, is clamped against the face of the disk by means of a nut 30 on the shaft, the latter being properly threaded to receive the nut. Hence by screwing the nut against the opposed head with more or less force the diameter of the disk will be adjusted, as above stated.

In the present instance three equidistant rollers are employed, the end rollers being arranged in the respective compartments of the hopper and the central roller extending into both compartments; but obviously the scope of the invention is unaffected by the particular number of rollers employed.

In order to obviate all liability of the splints within the hopper being forced by the feed-rollers between the latter and the opposed edge of the opening 13 in the hopper, I form on or affix to said edge depending fingers 31, that curve inwardly of the periphery of the rollers. In the drawings are shown one finger adjacent to each side roller and one finger adjacent to each side of the central roller, but of course the number of fingers applied may be varied at will.

Another feature of my invention relates to means for arresting the passage of the splints to the feed-drum when the coil has reached a predetermined size, as follows: 32 32 designate shoes, preferably beveled or wedge-shaped blocks, fitted to the respective web-guiding grooves in the circumference of the feed-drum, said shoes being interposed between the webs and the drum, as seen. These shoes are normally maintained some distance below the horizontal diameter of the feed-drum, so as not to interfere with the operation of the webs upon the drum or with that of the drum upon the splints in the hopper. The shoes are provided with lateral arms that embrace the respective webs, such arms being mounted on a transverse shaft 33, arranged adjacent to the drum. This shaft is supported on one arm of a lever 34, which is fulcrumed on the shaft of the feed-drum, whereby the act of properly moving the lever will raise the shoes to the discharge-opening 13 of the hopper and thus uniformly force the webs beyond the notched periphery of the drum without any liability of breaking the match-splints. When the webs are thus raised, the drum will turn idly past the opening.

As a simple and efficient means whereby the lever 34 shall be automatically operated I connect it by means of a link 35 with one arm $a$ of a lever 36, which is fulcrumed to the main frame, the other arm $b$ of the lever being provided with an offset segmental portion 37, that extends through an opening 38 in the swinging arm 5. Secured to the arm $a$ of the lever and to the side of the main frame is a strong spring 39, the tendency of which is to depress said arm and thus effect the elevation of the shoes. The construction is such that when the higher portion of the segment is engaged with the opening in the arm 5 the parts are held in a position opposed to the force of the spring; but when the arm during the coiling operation is raised sufficiently to clear the opening from that portion of the segment the spring draws down the connected portion of the lever, and in consequence the elevation of the shoes is effected.

As a means whereby the size of the coil may be varied as occasion may require I make the segment adjustable on the lever-arm, that is to say, the segment is a separate piece fitted to a recess in the arm and held in place by a through-bolt 37$^a$, the hole 37$^b$ for which in the segment is elongated, as shown.

In order that the position of the shoes in respect to the hopper may be nicely adjusted, I preferably construct the arms of the lever in separate parts, which are jointed at the fulcrum, one of the parts $a$ being provided on its under side with a lug 40, that extends beneath the other part $b$ and bears a set-screw 41, which takes against said latter part. Hence by properly manipulating this screw the position of the arm $a$ may be readily adjusted to effect the proper disposition of the shoes. Other equivalent devices to this end will suggest themselves to the mechanic.

To determine the throw of the swinging arm 5, so as to obviate all liability of the spool or spools on its free end being brought violently and injuriously into contact with the periphery of the feed-drum and also to prevent the arm being thrown too far rearwardly, I form on each side of said arm, adjacent to the bracket or post 42, in which its fulcrum-shaft is borne, lugs 43 44, to which are fitted set-screws 45 46, respectively. When the arm is thrown forward, the screw 45 abuts against the opposed face of the bracket, and thus limits the movement of the arm, and when said arm is thrown rearwardly the other screw 46 correspondingly coacts with the opposed face of the bracket.

Another feature of my invention relates to means for maintaining the splints upon the feed-drum during their transference from the hopper to the bunching device. Such means comprise a series of segmental guard-plates 47, disposed at suitable intervals adjacent to the periphery of the drum. These plates are provided with arms 48, that are fixed upon a transverse shaft 48$^a$, mounted in a lug 49 on the front of the hopper, the shaft being held in place by means of a set-screw 50. That portion of the shaft within the lug is eccentric, as at 51, so that by loosening the set-screw and properly turning the shaft the segments may be nicely adjusted in respect to the feed-drum. This done, the screw is tightened.

Another feature of my invention comprehends means for clearing and extracting from the transverse notches of the feed-drum any broken or imperfect splints that have not been taken up by the coiling device. To this end the periphery of the drum is provided with suitably-disposed circumferential grooves 52, that extend inwardly beyond the transverse notches. Supported on the main frame immediately beneath the feed-drum are inclined fingers 53, that project into the grooves 52 and bear against the drum, so that during the rotation of the latter any splints adhering thereto which have not been caught by the coilers will be scraped out of the notches and thus prevented from passing to the hopper.

In the machine illustrated herein the feed-drum is peripherally perforated, as indicated at 54. Stationary exhaust-chambers 55 are arranged within the drum in communication with the perforations, and said drums are connected with a fan or air-engine 56, by means of which the air is exhausted from said chambers, so that the splints in the hopper will be drawn upon the rotating drum. This air-exhaust feature is fully shown, described, and claimed in my Letters Patent of the United States No. 519,150, dated May 1, 1894, to which reference may be had.

With the view of utilizing the exhaust of the fan for the purpose of clearing from the perforations in the drum during each successive revolution thereof any broken splints or other matter that may become lodged in the perforations I suitably arrange in the lower portion of the drum a chamber or chambers 57, which are connected by means of a pipe 58 with the discharge-nozzle of the fan.

I claim—

1. In a match-making machine, the splint-containing hopper comprising a bottom portion, a front plate provided with longitudinal grooves therein, the ribs or walls of which are perforated, the side plates having their forward edges fitted to said grooves, the securing-screws, and the interposed tapering washers in said ribs or walls, substantially as described.

2. In a match-making machine, the splint-containing hopper consisting in the combination of the bottom plate provided with parallel grooves for each of the sides, the front plate provided with corresponding grooves, and the side plates having their lower and forward edges fitted to said grooves, substantially as described.

3. In a match-making machine, the splint-containing hopper consisting in the combination of the bottom plate provided with parallel grooves for each of the sides, the front plate provided with corresponding grooves, the walls or ribs of which are perforated, and the side plates having their lower and forward edges fitted to said grooves, together with the securing-screws, substantially as described.

4. In a match-making machine, the splint-containing hopper consisting in the combination of the bottom plate provided with parallel grooves for each of the sides, the front plate provided with corresponding grooves, the walls or ribs of which are perforated, and the side walls having their lower and forward edges fitted to said grooves, together with the securing-screws and the interposed tapering washers, substantially as described.

5. In a match-making machine, the combination with the feed device, and bunching mechanism coacting therewith, of a hopper comprising a bottom plate provided with a number of parallel grooves for each of the laterally-adjustable sides, the front plate provided with corresponding grooves, the side plates having their lower and forward edges fitted to said grooves, and a central partition dividing said hopper into two compartments both of which communicate with the feed device, substantially as specified.

6. In a match-making machine, the combination with the duplex feeding device and with duplex bunching mechanism coacting therewith, of the hopper having a central partition which divides it into two compartments, one of which communicates with each end portion of said feeding device, said hopper having laterally-adjustable sides, means for securing said adjustable sides in parallel relation to said portion, and means arranged at the discharge portions of the hopper-compartments in contact with the feed device, for the purpose of insuring the uniform passage of splints from said compartments to the feeding device, substantially as specified.

7. In a match-making machine the combination of a hopper, a feed-drum adjacent to the discharge of said hopper, a roller also adjacent to said discharge and in contact with said feed-drum, a coiling-web running around said drum, a hinged arm whose free end portion is adjacent to the periphery of said drum, a coiling-spool mounted on said arm, means for maintaining the splints upon said drum during their passage from the hopper to said spool, and means actuated by the movement of said hinged arm to automatically arrest the passage of splints to the said drum at predetermined times, substantially as specified.

8. In a match-making machine, the combination with a hopper, a transversely-notched and circumferentially-grooved feed-drum adjacent to the discharge thereof, a web running around said drum, a roller also adjacent to said discharge and in contact with said drum, means for varying the diameter of said roller, a depending curved finger adjacent to said roller, a segmental guard-plate above said roller, and adjacent to the periphery of the drum, and an inclined clearing-finger arranged to engage the circumferential grooves of the said drum, substantially as specified.

9. The combination, with the hopper or source of splint-supply, and the feed device, of the interposed shaft, a rubber roller thereon, clamping-heads on each side of said roller, one of said heads being seated against a shoulder of said shaft and a set-nut fitted to the shaft against the other of said heads and adapted to be forced against the head to effect the peripheral adjustment of said roller, substantially as described.

10. The combination, with the hopper, or source of splint-supply, and the feed device, of the interposed shaft, a series of rubber rollers thereon, clamping-heads on each side of each roller, one head of each pair being seated against a shoulder of the shaft and set-nuts fitted to the shaft adjacent to the opposite heads of the respective rollers and adapted to effect the independent peripheral adjustment of said rollers, substantially as described.

11. In a match-making machine, the combination, with the hopper or source of splint-supply, the feed device, the spool, its support, and the bunching-web coacting with said feed device and spool, of a shoe interposed between said web and feed device below the discharge of the hopper and adapted to be raised thereto and thereby force the adjacent portion of the web away from the feed device toward said discharge, and means for actuating said shoe, substantially as described.

12. In a match-making machine, the combination, with the hopper or source of splint-supply, the feed device, the spool, its support, and the bunching-web coacting with said feed device and spool, of a shoe interposed between said web and feed device below the discharge of the hopper, and adapted to be raised thereto and thereby force the adjacent portion of the web away from the feed device toward said discharge, and means for automatically actuating said shoe when the coil of splints has reached a predetermined size, substantially as described.

13. In a match-making machine, the combination, with the hopper or source of splint-supply, the feed-drum, the spool, its support, and the bunching-web coacting with said feed device and spool, of a normally-inactive shoe interposed between said web and feed device, a lever supporting said shoe, and a connection between said lever and the spool-support, whereby the shoe is operated when the coil has reached a certain size and said web is thereby forced away from the periphery of said drum and toward the discharge-opening and the passage of splints to the drum arrested, substantially as described.

14. In a match-making machine, the combination, with the hopper or source of splint-supply, the feed device, the spool, its support, and the bunching-web coacting with said feed device and spool, of the check-shoe arranged to force said web beyond the drum and toward the discharge of the hopper, a sectional supporting-lever therefor, the parts of the lever being hingedly connected and provided with a coacting adjusting device, and a trip connection between the lever and the spool-support, substantially as described.

15. In a match-making machine, the combination with the source of splint-supply, the feed device which receives the splints from said source, the bunching-web coacting with said feeding device, the hinged arm whose free portion is adjacent to said feed device, a bunching-spool on said arm, a check device for arresting the passage of splints to the feeding device and a lever one arm of which carries said check device, and whose opposite arm is operatively connected with the said hinged arm, whereby said lever and thereby the check device is operated by a predetermined position of said hinged arm, substantially as specified.

16. In a match-making machine, the combination with a source of splint-supply, a feed device, and bunching or assembling mechanism coacting therewith, of a compound lever provided at one end with a device adapted to arrest the passage of splints to said feed device, but which is normally inactive, a segment at the opposite end of said lever, and adjustably connected therewith, said segment having an operative engagement with a movable supporting-arm of the bunching or assembling mechanism, a spring connected to said lever and acting thereon with a force opposed to that exerted on the segment by said arm, and means whereby said lever may be adjusted to regulate the position of its check device with respect to the feed device, substantially as specified.

17. In a match-making machine, the combination, with the perforated feed-drum, the spool, its supporting and operating parts, and the web coacting with said spool and drum, of a chamber disposed within said drum to communicate with the perforations in the drum after they have passed the spool, and means for injecting air into said chamber, substantially as described.

In testimony whereof I have hereunto affixed my signature in the presence of two subscribing witnesses.

JOSEPH C. DONNELLY.

Witnesses:
JOHN R. NOLAN,
ANDREW T. GROUPE.